United States Patent
Chester et al.

(10) Patent No.: US 7,476,638 B2
(45) Date of Patent: *Jan. 13, 2009

(54) GASOLINE SULFUR REDUCTION IN FLUID CATALYTIC CRACKING

(75) Inventors: Arthur W. Chester, Cherry Hill, NJ (US); Hye Kyung Cho Timken, Woodbury, NJ (US); Terry G. Roberie, Ellicott City, MD (US); Michael S. Ziebarth, Columbia, MD (US)

(73) Assignee: W. R. Grace & Co. - Conn., Columbia, MD (US)

( * ) Notice: Subject to any disclaimer, the term of this patent is extended or adjusted under 35 U.S.C. 154(b) by 620 days.

This patent is subject to a terminal disclaimer.

(21) Appl. No.: 11/013,708

(22) Filed: Dec. 16, 2004

(65) Prior Publication Data

US 2005/0124485 A1  Jun. 9, 2005

Related U.S. Application Data

(63) Continuation of application No. 09/144,607, filed on Aug. 31, 1998, now Pat. No. 6,852,214.

(51) Int. Cl.
    *B01J 21/06* (2006.01)
(52) U.S. Cl. ............... 502/64; 502/60; 502/65; 502/73; 502/79

(58) Field of Classification Search ........... 502/60, 502/73, 64, 65, 79
See application file for complete search history.

(56) References Cited

U.S. PATENT DOCUMENTS

| 4,153,535 | A | * | 5/1979 | Vasalos et al. | 208/120.05 |
| 4,340,465 | A | * | 7/1982 | Miller et al. | 208/120.15 |
| 4,549,956 | A | * | 10/1985 | Chu | 208/120.15 |
| 5,705,729 | A | * | 1/1998 | Huang | 585/722 |
| 6,974,787 | B2 | * | 12/2005 | Chester et al. | 502/65 |

* cited by examiner

*Primary Examiner*—Elizabeth D Wood
(74) *Attorney, Agent, or Firm*—Charles A. Cross; Beverly J. Artale

(57) ABSTRACT

The sulfur content of liquid cracking products, especially the cracked gasoline, of the catalytic cracking process is reduced by the use of a sulfur reduction additive comprising a porous molecular sieve which contains a metal in an oxidation state above zero within the interior of the pore structure of the sieve. The molecular sieve is normally a large pore size zeolite such as USY or zeolite beta or an intermediate pore size zeolite such as ZSM-5. The metal is normally a metal of Period 3 of the Periodic Table, preferably zinc or vanadium. The sulfur reduction catalyst may be used in the form of a separate particle additive or as a component of an integrated cracking/sulfur reduction catalyst.

6 Claims, No Drawings

GASOLINE SULFUR REDUCTION IN FLUID CATALYTIC CRACKING

CROSS REFERENCE TO RELATED APPLICATIONS

This application is a continuation of application Ser. No. 09/144,607, filed 31 Aug. 1998, now U.S. Pat. No. 6,852,214.

FIELD OF THE INVENTION

This invention relates to the reduction of sulfur in gasolines and other petroleum products produced by the catalytic cracking process. The invention provides a catalytic composition for reducing product sulfur and a process for reducing the product sulfur using this composition.

BACKGROUND OF THE INVENTION

Catalytic cracking is a petroleum refining process which is applied commercially on a very large scale, especially in the United States where the majority of the refinery gasoline blending pool is produced by catalytic cracking, with almost all of this coming from the fluid catalytic cracking (FCC) process. In the catalytic cracking process heavy hydrocarbon fractions are converted into lighter products by reactions taking place at elevated temperature in the presence of a catalyst, with the majority of the conversion or cracking occurring in the vapor phase. The feedstock is so converted into gasoline, distillate and other liquid cracking products as well as lighter gaseous cracking products of four or less carbon atoms per molecule. The gas partly consists of olefins and partly of saturated hydrocarbons.

During the cracking reactions some heavy material, known as coke, is deposited onto the catalyst. This reduces its catalytic activity and regeneration is desired. After removal of occluded hydrocarbons from the spent cracking catalyst, regeneration is accomplished by burning off the coke and then the catalyst activity is restored. The three characteristic steps of the catalytic cracking can be therefore be distinguished: a cracking step in which the hydrocarbons are converted into lighter products, a stripping step to remove hydrocarbons adsorbed on the catalyst and a regeneration step to burn off coke from the catalyst. The regenerated catalyst is then reused in the cracking step.

Catalytic cracking feedstocks normally contain sulfur in the form of organic sulfur compounds such as mercaptans, sulfides and thiophenes. The products of the cracking process correspondingly tend to contain sulfur impurities even though about half of the sulfur is converted to hydrogen sulfide during the cracking process, mainly by catalytic decomposition of non-thiophenic sulfur compounds. The distribution of sulfur in the cracking products is dependent on a number of factors including feed, catalyst type, additives present, conversion and other operating conditions but, in any event a certain proportion of the sulfur tends to enter the light or heavy gasoline fractions and passes over into the product pool. With increasing environmental regulation being applied to petroleum products, for example in the Reformulated Gasoline (RFG) regulations, the sulfur content of the products has generally been decreased in response to concerns about the emissions of sulfur oxides and other sulfur compounds into the air following combustion processes.

One approach has been to remove the sulfur from the FCC feed by hydrotreating before cracking is initiated. While highly effective, this approach tends to be expensive in terms of the capital cost of the equipment as well as operationally since hydrogen consumption is high. Another approach has been to remove the sulfur from the cracked products by hydrotreating. Again, while effective, this solution has the drawback that valuable product octane may be lost when the high octane olefins are saturated.

From the economic point of view, it would be desirable to achieve sulfur removal in the cracking process itself since this would effectively desulfurize the major component of the gasoline blending pool without additional treatment. Various catalytic materials have been developed for the removal of sulfur during the FCC process cycle but, so far, most developments have centered on the removal of sulfur from the regenerator stack gases. An early approach developed by Chevron used alumina compounds as additives to the inventory of cracking catalyst to adsorb sulfur oxides in the FCC regenerator; the adsorbed sulfur compounds which entered the process in the feed were released as hydrogen sulfide during the cracking portion of the cycle and passed to the product recovery section of the unit where they were removed. See Krishna et al, *Additives Improve FCC Process*, Hydrocarbon Processing, Nov. 1991, pages 59-66. The sulfur is removed from the stack gases from the regenerator but product sulfur levels are not greatly affected, if at all.

An alternative technology for the removal of sulfur oxides from regenerator removal is based on the use of magnesium-aluminum spinels as additives to the circulating catalyst inventory in the FCCU. Under the designation DESOX™ used for the additives in this process, the technology has achieved a notable commercial success. Exemplary patents on this type of sulfur removal additive include U.S. Pat. Nos. 4,963,520; 4,957,892; 4,957,718; 4,790,982 and others. Again, however, product sulfur levels are not greatly reduced.

A catalyst additive for the reduction of sulfur levels in the liquid cracking products is proposed by Wormsbecher and Kim in U.S. Pat. Nos. 5,376,608 and 5,525,210, using a cracking catalyst additive of an alumina-supported Lewis acid for the production of reduced-sulfur gasoline but this system has not achieved significant commercial success. The need for an effective additive for reducing the sulfur content of liquid catalytic cracking products has therefore persisted.

SUMMARY OF THE INVENTION

We have now developed catalytic additive materials for the catalytic cracking process which are capable of reducing the sulfur content of the liquid products of the cracking process. Sulfur reduction in the gasoline cracking fraction and in other fractions including middle distillate from the light cycle oil is made possible.

The present sulfur reduction catalysts are used in combination with the active cracking catalyst in the cracking unit, that is, in combination with the conventional major component of the circulating cracking catalyst inventory which is usually a matrixed, zeolite containing catalyst based on a faujasite zeolite, usually zeolite Y. The sulfur reduction catalysts may be used as a separate particle additive which is used in combination with the cracking catalyst or as a component of an integrated catalyst.

According to the present invention, the sulfur removal composition comprises a porous molecular sieve which contains a metal in an oxidation state above zero within the interior of the pore structure of the sieve. The molecular sieve is in most cases a zeolite and it may be a zeolite having characteristics consistent with the large pore zeolites such as zeolite beta or zeolite USY or with the intermediate pore size zeolites such as ZSM-5. Non-zeolitic molecular sieves such as MeAPO-5, MeAPSO-5, as well as the mesoporous crystalline materials such as MCM-41 may be used as the sieve component of the catalyst. Metals such as vanadium, zinc, iron, cobalt, and gallium are effective. The metal-containing sieves or zeolites are used in combination with the active catalytic cracking catalyst (normally a faujasite such as zeolite Y) to process hydrocarbon feedstocks in the fluid catalytic cracking (FCC) unit to produce low-sulfur gasoline and other liquid products, for example, light cycle oil that can be used as a low sulfur diesel blend component or as heating oil.

While the mechanism by which the metal-containing zeolites remove the sulfur components normally present in cracked hydrocarbon products is not precisely understood, it does involve the conversion of organic sulfur compounds in the feed to inorganic sulfur so that the process is a true catalytic process. In this process, it is believed that a zeolite or other molecular sieve provides shape selectivity with varying pore size, and the metal sites in zeolite provide adsorption sites for the sulfur species. Thus we have named our process "shape-selective desulfurization."

DETAILED DESCRIPTION

FCC Process

The present sulfur removal catalysts are used as a catalytic component of the circulating inventory of catalyst in the catalytic cracking process, which these days is almost invariably the fluid catalytic cracking (FCC) process. For convenience, the invention will be described with reference to the FCC process although the present additives could be used in the older moving bed type (TCC) cracking process with appropriate adjustments in particle size to suit the requirements of the process. Apart from the addition of the present additive to the catalyst inventory and some possible changes in the product recovery section, discussed below, the manner of operating the process will remain unchanged. Thus, conventional FCC catalysts may be used, for example, zeolite based catalysts with a faujasite cracking component as described in the seminal review by Venuto and Habib, Fluid Catalytic Cracking with Zeolite Catalysts, Marcel Dekker, N.Y. 1979, ISBN 0-8247-6870-1 as well as in numerous other sources such as Sadeghbeigi, Fluid Catalytic Cracking Handbook, Gulf Publ. Co. Houston, 1995, ISBN 0-88415-290-1.

Somewhat briefly, the fluid catalytic cracking process in which the heavy hydrocarbon feed containing the organosulfur compounds will be cracked to lighter products takes place by contact of the feed in a cyclic catalyst recirculation cracking process with a circulating fluidizable catalytic cracking catalyst inventory consisting of particles having a size ranging from about 20 to about 100 microns. The significant steps in the cyclic process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form liquid cracking products including gasoline, (iv) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed.

In the present process, the sulfur content of the gasoline portion of the liquid cracking products, is effectively brought to lower and more acceptable levels by carrying out the catalytic cracking in the presence of the sulfur reduction catalyst.

The present sulfur reduction catalysts may be used in the form of a separate particle additive which is added to the main cracking catalyst in the FCCU or, alternatively, the sulfur reduction catalyst may be included as an additional component of the cracking catalyst to provide an integrated cracking/sulfur reduction catalyst system. The cracking catalyst will normally be based on a faujasite zeolite active cracking component, which is conventionally zeolite Y in one of its forms such as calcined rare-earth exchanged type Y zeolite (CREY), the preparation of which is disclosed in U.S. Pat. No. 3,402,996, ultrastable type Y zeolite (USY) as disclosed in U.S. Pat. No. 3,293,192, as well as various partially exchanged type Y zeolites as disclosed in U.S. Pat. Nos. 3,607,043 and 3,676,368. The active cracking component is routinely combined with a matrix material such as alumina in order to provide the desired mechanical characteristics (attrition resistance etc.) as well as activity control for the very active zeolite component or components. The particle size of the cracking catalyst is typically in the range of 10 to 100 microns for effective fluidization. If used as a separate particle additive, the sulfur reduction catalyst (and any other additive) is normally selected to have a particle size comparable with that of the cracking catalyst so as to prevent component separation during the cracking cycle.

Sieve Component

According to the present invention, the sulfur removal catalyst comprises a porous molecular sieve which contains a metal in an oxidation state above zero within the interior of the pore structure of the sieve. The molecular sieve is in most cases a zeolite and it may be a zeolite having characteristics consistent with the large pore zeolites such as zeolite beta or with the intermediate pore size zeolites such as ZSM-5, with the latter class being preferred.

The molecular sieve component of the present sulfur reduction catalysts may, as noted above, be a zeolite or a non-zeolitic molecular sieve. When used, zeolites may be selected from the large pore size zeolites or intermediate pore zeolites (see Shape Selective Catalysis in Industrial Applications, Chen et al, Marcel Dekker Inc., N.Y. 1989, ISBN 0-8247-7856-1, for a discussion of zeolite classifications by pore size according to the basic scheme set out by Frilette et al in J. Catalysis 67, 218-222 (1981)). The small pore size zeolites such as zeolite A and erionite, besides having insufficient stability for use in the catalytic cracking process, will generally not be preferred because of their molecular size exclusion properties which will tend to exclude the components of the cracking feed as well as many components of the cracked products. The pore size of the sieve does not, however, appear to be critical since, as shown below, both medium and large pore size zeolites have been found to be effective, as have the mesoporous crystalline materials such as MCM-41.

Zeolites having properties consistent with the existence of a large pore (12 ring) structure which may be used to make the present sulfur reduction catalysts include zeolites Y in its various forms such as Y, REY, CREY, USY, of which the last is preferred, as well as other zeolites such as zeolite L, zeolite beta, mordenite including de-aluminated mordenite, and zeolite ZSM-18. Generally, the large pore size zeolites are characterized by a pore structure with a ring opening of at least 0.7 nm and the medium or intermediate pore size zeolites will have a pore opening smaller than 0.7 nm but larger than about 0.56 nm. Suitable medium pore size zeolites which may be used include the pentasil zeolites such as ZSM-5, ZSM-22, ZSM-23, ZSM-35, ZSM-50, ZSM-57, MCM-22, MCM-49, MCM-56 all of which are known materials. Zeolites may be used with framework metal elements other than aluminum, for example, boron, gallium, iron, chromium.

The use of zeolite USY is particularly desirable since this zeolite is typically used as the active cracking component of the cracking catalyst and it is therefore possible to use the sulfur reduction catalyst in the form of an integrated cracking/sulfur reduction catalyst. The USY zeolite used for the cracking component may also, to advantage, be used as the sieve component for a separate particle additive catalyst. Stability is correlated with low unit cell size with USY and, for optimum results, the UCS should be from 2.420 to 2.455 nm, preferably 2.425 to 2.450 nm, with the range of 2.435 to 2.440 nm being very suitable.

In addition to the zeolites, other molecular sieves may be used although they may not be as favorable since it appears that some acidic activity (conventionally measured by the alpha value) is required for optimum performance. Experimental data indicate that alpha values in excess of about 10 (sieve without metal content) are suitable for adequate desulfurization activity, with alpha values in the range of 0.2 to 2,000 being normally suitable[1]. Alpha values from 0.2 to 300 represent the normal range of acidic activity for these additives.

The alpha test is a convenient method of measuring the overall acidity, inclusive of both its internal and external acidity, of a solid material such as a molecular sieve. The test is described in U.S. Pat. No. 3,354,078; in the Journal of Catalysis, Vol. 4, p. 527 (1965); Vol. 6, p. 278 (1966); and Vol. 61, p. 395 (1980). Alpha values reported in this specification are measured at a constant temperature of 538° C.

Exemplary non-zeolitic sieve materials which may provide suitable support components for the metal component of the present sulfur reduction catalysts include silicates (such as the metallosilicates and titanosilicates) of varying silica-alumina ratios, metalloaluminates (such as germaniumaluminates), metallophosphates, aluminophosphates such as the silico- and metalloaluminophosphates referred to as metal integrated aluminophosphates (MeAPO and ELAPO), metal integrated silicoaluminophosphates (MeAPSO and ELAPSO), silicoaluminophosphates (SAPO), gallogerminates and combinations of these. A discussion on the structural relationships of SAPO's, AlPO's, MeAPO's, and MeAPSO's may be found in a number of resources including Stud. Surf. Catal. 37 13-27 (1987). The AlPO's contain aluminum and phosphorus, whilst in the SAPO's some of the phosphorus and/or some of both phosphorus and aluminum is replaced by silicon. In the MeAPO's various metals are present, such as Li, B, Be, Mg, Ti, Mn, Fe, Co, An, Ga, Ge, and As, in addition to aluminum and phosphorus, whilst the MeAPSO's additionally contain silicon. The negative charge of the $Me_aAl_bP_cSi_dO_e$ lattice is compensated by cations, where Me is magnesium, manganese, cobalt, iron and/or zinc. MexAPSOs are described in U.S. Pat. No. 4,793,984. SAPO-type sieve materials are described in U.S. Pat. No. 4,440,871; MeAPO type catalysts are described in U.S. Pat. Nos. 4,544,143 and 4,567,029; ELAPO catalysts are described in U.S. Pat. No. 4,500,651, and ELAPSO catalysts are described in European Patent Application 159,624. Specific molecular sieves are described, for example, in the following patents: MgAPSO or MAPSO-U.S. Pat. No. 4,758,419. MnAPSO-U.S. Pat. No. 4,686,092; CoAPSO-U.S. Pat. No. 4,744,970; FeAPSO-U.S. Pat. No. 4,683,217 and ZnAPSO U.S. Pat. No. 4,935,216. Specific silicoaluminophosphates which may be used include SAPO-11, SAPO-17, SAPO-34, SAPO-37; other specific sieve materials include MeAPO-5, MeAPSO-5.

Another class of crystalline support materials which may be used is the group of mesoporous crystalline materials exemplified by the MCM-41 and MCM-48 materials. These mesoporous crystalline materials are described in U.S. Pat. Nos. 5,098,684; 5,102,643; and 5,198,203. MCM-41, which is described in U.S. Pat. No. 5,098,684, is characterized by a microstructure with a uniform, hexagonal arrangement of pores with diameters of at least about 1.3 nm: after calcination it exhibits an X-ray diffraction pattern with at least one d-spacing greater than about 1.8 nm and a hexagonal electron diffraction pattern that can be indexed with a d100 value greater than about 1.8 nm which corresponds to the d-spacing of the peak in the X-ray diffraction pattern. The preferred catalytic form of this material is the aluminosilicate although other metallosilicates may also be utilized. MCM-48 has a cubic structure and may be made by a similar preparative procedure.

Metal Component

A metal component is incorporated into the molecular sieve support material to make up the present additives. In order to be effective, the metal or metals should be present inside the pore structure of the sieve component. Metal-containing zeolites and other molecular sieves can be prepared by (1) post-addition of metals to the sieve or to a catalyst containing the sieve(s), (2) synthesis of the sieve(s) containing metal atoms in the framework structure, and by (3) synthesis of the sieve(s) with trapped, bulky metal ions in the zeolite pores. Following addition of the metal component, washing to remove unbound ionic species and drying and calcination should be performed. These techniques are all known in themselves. Post-addition of the metal ions is preferred for simplicity and economy, permitting available sieve materials to be converted to use for the present additives. A wide variety of post-addition methods of metals can be used to produce a catalyst of our invention, for example, aqueous exchange of metal ions, solid-state exchange using metal halide salt(s), impregnation with a metal salt solution, and vapor deposition of metals. In each case, however, it is important to carry out the metal(s) addition so that the metal component enters the pore structure of the sieve component.

It has been found that when the metal is present as exchanged cationic species in the pores of the sieve component, the hydrogen transfer activity of the metal component is reduced to the point that hydrogen transfer reactions taking place during the cracking process will normally maintained at an acceptably low level with the preferred metal components. Thus, coke and light gas make during cracking increase slightly but they remain within tolerable limits. Since the unsaturated light ends can be used in any event as alkylation feed and in this way recycled to the gasoline pool, there is no significant loss of gasoline range hydrocarbons incurred by the use of the present additives.

Because of the concern for excessive coke and hydrogen make during the cracking process, the metals for incorporation into the additives should not exhibit hydrogenation activity to a marked degree. For this reason, the noble metals such as platinum and palladium which possess strong hydrogenation-dehydrogenation functionality are not desirable. Base metals and combinations of base metals with strong hydrogenation functionality such as nickel, molybdenum, nickel-tungsten, cobalt-molybdenum and nickel-molybdenum are not desirable for the same reason. The preferred base metals are the metals of Period 3, Groups 5, 8, 9, 12, (IUPAC classification, previously Groups 2B, 5B and 8B) of the Periodic Table. Vanadium, zinc, iron, cobalt, and gallium are effective with vanadium being the preferred metal component. It is surprising that vanadium can be used in this way in an FCC catalyst composition since vanadium is normally thought to have a very serious effect on zeolite cracking catalysts and much effort has been expended in developing vanadium suppressers. See, for example, Wormsbecher et al, Vanadium Poisoning of Cracking Catalysts: Mechanism of Poisoning and Design of Vanadium Tolerant Catalyst System, J. Catalysis 100, 130-137 (1986). It is believed that the location of the vanadium inside the pore structure of the sieve immobilizes the vanadium and prevents it from becoming vanadic acid species which can combine deleteriously with the sieve component; in any event, the present zeolite-based sulfur reduction catalysts containing vanadium as the metal component have undergone repeated cycling between reductive and oxidative/steaming conditions representative of the FCC cycle while retaining the characteristic zeolite structure, indicating a different environment for the metal.

Vanadium is particularly suitable for gasoline sulfur reduction when supported on zeolite USY. The yield structure of the V/USY sulfur reduction catalyst is particularly interesting. While other zeolites, after metals addition, demonstrate gasoline sulfur reduction, they tend to convert gasoline to C3 and C4 gas. Even though much of the converted C3=and C4=can be alkylated and re-blended back to the gasoline pool, the high C4-wet gas yield may be a concern since many refineries are limited by their wet gas compressor capacity. The metal-containing USY has similar yield structure to current FCC catalysts; this advantage would allow the V/USY zeolite content in a catalyst blend to be adjusted to a target desulfurization level without limitation from FCC unit constraints. The vanadium on Y zeolite catalyst, with the zeolite represented by USY, is therefore particularly favorable for gasoline sulfur reduction in FCC. The USY which has been found to give particularly good results is a USY with low unit cell size in the range from 2.435 to 2.450 nm and a correspondingly low alpha value. Combinations of base metals such as vanadium/zinc may also be favorable in terms of overall sulfur reduction.

Normally the most convenient manner to use the sulfur reduction catalyst will be as a separate particle additive to the catalyst inventory. When used in this way, it may be used in the form of the pure sieve crystal, pelleted (without matrix) to the correct size for FCC use but the metal-containing sieve will usually be matrixed in order to achieve adequate particle attrition resistance so as to maintain satisfactory fluidization. Conventional cracking catalyst matrix materials such as alumina or silica-alumina, usually with added clay, will be suitable for this purpose. The amount of matrix relative to the sieve will normally be from 20:80 to 80:20 by weight. Conventional matrixing techniques may be used.

As an alternative to the use of the separate particle additive, the sulfur reduction catalyst may incorporated into the cracking catalyst to form an integrated FCC cracking/gasoline sulfur reduction catalyst. Since zeolite USY, which is a useful cracking catalyst component, has been shown to provide good product sulfur reduction activity, it is convenient to incorporate the metal component into a cracking catalyst in a way which ensures that the metal enters the interior pore structure of the sieve, i.e. the USY zeolite. This can suitably be done by recalcining a USY cracking catalyst to ensure low unit cell size and then incorporating the metal, e.g. vanadium by ion exchange or by impregnation under conditions which permit cation exchange to take place so that the metal ion is immobilized in the pore structure of the zeolite. In this case, the impregnation/exchange process should be carried out with a controlled amount of metal so that the requisite number of sites are left on the sieve to catalyze the cracking reactions. Alternatively, the metal can be incorporated into the sieve component, e.g. USY zeolite or ZSM-5 after any necessary calcination to remove organics from the synthesis after which the metal-containing component can be formulated into the finished catalyst composition by the addition of the cracking and matrix components and the formulation spray dried to form the final catalyst. The amount of the sulfur reduction component will typically be up to 25 weight percent of the entire catalyst, corresponding to the amounts in which it may be used as a separate particle additive, as described below.

The amount of the metal component in the sulfur reduction additive catalyst is normally from 0.2 to 5 weight percent, typically 0.5 to 5 weight percent, (as metal, relative to weight of sieve component) but amounts outside this range, for example, from 0.10 to 10 weight percent may still be found to give some sulfur removal effect.

When the sulfur reduction catalyst is used in the form of an integrated cracking/sulfur reduction catalyst, the amount of metal will be somewhat lower, reflecting the dual functionality of the system but for practical purposes of formulation, the range of metal contents will typically extend from 0.1 to 5, more typically from 0.2 to 2 weight percent of the entire catalyst.

Sulfur Reduction Catalyst Use

The sulfur reduction catalyst is conveniently used as a separate particle catalyst additive since it permits the ratio of sulfur reduction and cracking catalyst components to be optimized according to the amount of sulfur in the feed and the desired degree of desulfurization; when used in this manner, it is typically used in an amount from 1 to 50 weight percent of the entire catalyst inventory in the FCCU; in most cases the amount will be from 5 to 25 weight percent, e.g. 5 to 15 weight percent. About 10 percent represents a norm for most practical purposes. The additive may be added in the conventional manner, with make-up catalyst to the regenerator or by any other convenient method. The additive remains active for sulfur removal for extended periods of time although very high sulfur feeds may result in loss of sulfur removal activity in shorter times.

Other catalytically active components may be present in the circulating inventory of catalytic material in addition to the cracking catalyst and the sulfur removal additive. Examples of such other materials include the octane enhancing catalysts based on zeolite ZSM-5, CO combustion promoters based on a supported noble metal such as platinum, stack gas desulfurization additives such as DESOX™ (magnesium aluminum spinel), vanadium traps and bottom cracking additives, such as those described in Krishna, Sadeghbeigi, op cit and Scherzer, Octane Enhancing Zeolitic FCC Catalysts, Marcel Dekker, N.Y., 1990, ISBN 0-8247-8399-9. These other components may be used in their conventional amounts.

The effect of the present additives is to reduce the sulfur content of the liquid cracking products, especially the light and heavy gasoline fractions although reductions are also noted in the light cycle oil, making this more suitable for use as a diesel or home heating oil blend component. The sulfur removed by the use of the catalyst is converted to inorganic form and released as hydrogen sulfide which can be recovered in the normal way in the product recovery section of the FCCU in the same way as the hydrogen sulfide conventionally released in the cracking process. The increased load of hydrogen sulfide may impose additional sour gas/water treatment requirements but with the significant reductions in gasoline sulfur achieved, these are not likely to be considered limitative.

Very significant reductions in gasoline sulfur can be achieved by the use of the present catalysts, in some cases up to about 75% relative to the base case using a conventional cracking catalyst, at constant conversion, using the preferred form of the catalyst described above. Gasoline sulfur reduction of 25% is readily achievable with many of the additives according to the invention, as shown by the Examples below. The extent of sulfur reduction may depend on the original organic sulfur content of the cracking feed, with the greatest reductions achieved with the higher sulfur feeds. The metals content of the equilibrium catalyst in the unit may also affect the degree of desulfurization achieved, with a low metals content, especially vanadium content, on the equilibrium catalyst favoring greater desulfurization. Desulfurization will be very effective with E-catalyst vanadium contents below 1,000 ppm although the present catalyst remain effective even at much higher vanadium contents, as shown in Table 17 below. Sulfur reduction may be effective not only to improve product quality but also to increase product yield in cases where the refinery cracked gasoline end point has been limited by the sulfur content of the heavy gasoline fraction; by providing an effective and economical way to reduce the sulfur content of the heavy gasoline fraction, the gasoline end point may be extended without the need to resort to expensive hydrotreating, with a consequent favorable effect on refinery economics. Removal of the various thiophene derivatives which are. refractory to removal by hydrotreating under less severe conditions is also desirable if subsequent hydrotreatment is contemplated.

EXAMPLES

Example 1 though Example 7 describe the preparation of metal-containing zeolites.

Example 1

Preparation of Zinc Exchanged Zeolites

A series of Zn2+ exchanged zeolites with varying pore sizes were prepared as summarized in Table 1. ZSM-5 with 26/1 SiO2/Al2O3 ratio, MCM-49 with 19/1 SiO2/Al2O3 ratio, Beta with 35/1 SiO2/Al2O3 ratio, and siliceous MCM41 were first prepared in the hydrogen form by ammonium exchange and calcination. A sample of low-unit-cell-size USY (CBV600 USY, 2.438 nm UCS) with 5.4 bulk SiO2/Al2O3 ratio was obtained from PQ and used without further treatment. Zinc was added to the H-form zeolites by aqueous exchanges with ZnCl2 Solution. The Zn exchanged zeolites were washed until Cl— free in the washed solution to remove any unbound ionic species. Then the zeolites were dried and calcined in flowing air at 540° C. for 3 hours. Zn loadings into zeolite pores varied from 0.9% Zn to 8.3% Zn. Physical properties of the Zn/zeolites are summarized in Table 1.

TABLE 1

Physical Properties of the Zinc/Zeolite Examples

| | Zn/ZSM-5 | Zn/MCM-49 | Zn/Beta | Zn/USY | Zn/MCM-41 |
|---|---|---|---|---|---|
| Calcined Cat. | | | | | |
| Zn loading, wt % | 1.5 | 0.9 | 2.0 | 0.9 | 8.3 |
| Na, ppm | — | — | — | 580 | — |
| Surface area, m$^2$g$^{-1}$ | 392 | 542 | 711 | 685 | 779 |
| Alpha | 1050 | 420 | 60 | 60 | — |
| UCS, nm | — | — | — | 2.438 | — |
| Steam Deactivated Cat. (815° C. 4 hrs) | | | | | |
| Surface area, m$^2$g$^{-1}$ | 290 | 362 | 187 | 534 | 545 |
| Alpha | 13 | 2 | 8 | 1 | — |

Example 2

Preparation of Vanadium Exchanged Zeolites

A series of vanadium exchanged zeolites with varying pore sizes were prepared as summarized in Table 2. The preparation procedures were similar to those of Example 1 except vanadyl sulfate was used for vanadium exchanges. Vanadium loadings into the zeolites vary ranging from 0.1 to 1.1 wt % V.

X-ray photoelectron spectroscopy (XPS) was used to estimate the oxidation state of the V in V/USY. The binding energies measured for the fresh and steamed V/USY are close to those of reference samples, V2O4 and V2O5. The XPS results suggest that the vanadium species in V/USY has an oxidation state in the range of IV and V. When it is fully oxidized, the oxidation state is close to V5+. Upon reduction with a propylene/N2 gas stream at an elevated temperature, the oxidation state is changed to V4+ (see Catalysis at Surfaces, I. M. Campbell, Chapter 4.4.4, Chapman and Hall Ltd., N.Y., 1988, for a discussion of XPS for catalyst characterization).

TABLE 2

Physical Properties of the Vanadium/Zeolite Examples

| | V/ZSM-5 | V/MCM-49 | V/Beta | V/USY | V/MCM-41 |
|---|---|---|---|---|---|
| Calcined Cat. | | | | | |
| V loading, wt % | 0.2 | 0.4 | 0.8 | 1.1 | 0.1 |
| Na, ppm | 205 | — | — | 330 | — |
| Surface area, m$^2$g$^{-1}$ | 409 | 543 | 723 | 732 | 770 |
| Alpha | 950 | 430 | 840 | 20 | — |
| UCS, Å | — | — | — | 24.36 | — |
| Steam Deactivated Cat. (815° C. 4 hrs) | | | | | |
| Surface area, m$^2$g$^{-1}$ | 328 | 404 | 169 | 268 | 549 |
| Alpha | — | — | — | 1 | — |

Example 3

Preparation of Iron Exchanged Zeolites

A series of iron exchanged zeolites with varying pore sizes were prepared as shown in Table 3. ZSM-5 with 26/1 $SiO_2/Al_2O_3$ ratio, MCM49 with 19/1 $SiO_2/Al_2O_3$ ratio, Beta with 35/1 $SiO_2/Al_2O_3$ ratio, and low-unit-cell-size USY (CBV600 USY, 24.38 Å UCS) with 5.4 bulk $SiO_2/Al_2O_3$ ratio were used. The preparation procedures were similar to those of Example 1 except iron (III) chloride was used for iron exchanges. The Fe loading into the zeolites vary widely, ranging from 0.6 to 3.5 wt % Fe. All of the exchanged zeolites exhibit excellent retention of surface area and zeolite crystallinity upon steam deactivation.

TABLE 3

Physical Properties of the Iron/Zeolite Examples

|  | Fe/ZSM-5 | Fe/MCM-49 | Fe/Beta | Fe/USY |
|---|---|---|---|---|
| Calcined Cat. | | | | |
| Fe loading, wt % | 0.6 | 1.2 | 2.0 | 3.5 |
| Surface area, $m^2 g^{-1}$ | 402 | 586 | 704 | 771 |
| Alpha | 1540 | 320 | 140 | 20 |
| UCS, Å | — | — | — | 24.35 |
| Steam Deactivated Cat. (815° C. 4 hrs) | | | | |
| Surface area, $m^2 g^{-1}$ | 322 | 456 | 419 | 509 |
| Alpha | 1.4 | 1.9 | 1.7 | 0.8 |

Example 4

Preparation of Cobalt Exchanged Zeolites

A series of cobalt solid-state exchanged zeolites with varying pore sizes were prepared as shown in Table 4. The exchange procedure was adopted from experiments published in Applied Catalysis A: 150, 1997 pp 231-242 by Li et al. ZSM-5 with 26/1 m2g-1 ratio, siliceous ZSM-5 with 450/1 SiO2/Al2O3 ratio, Beta with 35/1 SiO2/Al2O3 ratio, USY (Z14 USY from Grace, 24.52 Å UCS) with 5.4 bulk SiO2/Al2O3 ratio, and siliceous MCM41 were used. 28.2 g of CoCl3.6H2O purchased from Aldrich was ground finely, mixed with 50 g of 26/1 SiO2/Al2O3 ratio ZSM-5 crystals and then the mixture was lightly grounded together. The weight of CoCl3.6H2O corresponds to 2:1 molar ratio of Co to the Al content of the ZSM-5. The mixture was loaded to a ceramic dish with a loose cover and calcined in the atmosphere at 370° C. for 6 hours. The calcined product was poured in a DI water and let it sit for 10 minutes, filtered, and washed with DI water until the wash solution is Cl— free. Then the filter cake was dried and calcined in the atmosphere at 540° C. for 3 hours. Preparation procedures for other zeolites were similar to those of Co/ZSM-5 except 0.5:1 Co:Al mole ratio was used for USY, and excess Co was used for siliceous zeolites. The Co loading into the zeolite ranges from 1.5 to 3.2 wt % Co. All of the exchanged zeolites exhibit excellent retention of surface area and zeolite crystallinity upon steam deactivation.

TABLE 4

Physical Properties of the Cobalt/Zeolite Examples

|  | Co/ZSM-5 (26/1) | Co/ZSM-5 (450/1) | Co/Beta | Co/USY | Co/MCM-41 |
|---|---|---|---|---|---|
| Calcined Cat. | | | | | |
| Co loading, wt % | 3.2 | 2.2 | 1.9 | 2.1 | 1.5 |
| Na, ppm | 125 | 110 | 160 | 1380 | 120 |
| Surface area, $m^2 g^{-1}$ | 363 | 410 | 739 | 776 | 738 |
| Alpha | 200 | 40 | 94 | 108 | 0 |
| Steam Deactivated Cat. (815° C. 4 hrs) | | | | | |
| Surface area, $m^2 g^{-1}$ | 284 | 378 | 182 | 197 | 409 |
| Alpha | 3 | 4 | 3 | 0 | 0 |

Example 5

Preparation of Gallium Exchanged Zeolites

A series of gallium exchanged zeolites with varying pore sizes were prepared as shown in Table 5. ZSM-5 with 26/1 $SiO_2/Al_2O_3$ ratio, MCM-49 with 19/1 $SiO_2/Al_2O_3$ ratio, Beta with 35/1 $SiO_2/Al_2O_3$ ratio, and USY (Z14 USY from Grace, 2.452 nm UCS) with 5.4 bulk $SiO_2/Al_2O_3$ ratio were used. The preparation procedures were similar to those of Example 1 except gallium (III) nitrate was used for gallium exchanges. The Ga loading into the zeolite varies ranging from 0.7 to 5.6 wt % Ga. All of the exchanged zeolites exhibit excellent retention of surface area and zeolite crystallinity upon steam deactivation.

TABLE 5

Physical Properties of the Gallium/Zeolite Examples

|  | Ga/ZSM-5 | Ga/MCM-49 | Ga/Beta | Ga/USY |
|---|---|---|---|---|
| Calcined Cat. | | | | |
| Ga loading, wt % | 0.7 | 1.2 | 3.1 | 5.6 |
| Surface area, $m^2 g^{-1}$ | 403 | 571 | 708 | 788 |
| Alpha | 1700 | 320 | 60 | — |
| UCS, nm | — | — | — | 2.450 |
| Steam Deactivated Cat. (815° C. 4 hrs) | | | | |
| Surface area, $m^2 g^{-1}$ | 331 | 429 | 244 | 714 |
| Alpha | 3 | 40 | 18 | — |

Example 6

Preparation of Framework Fe-Containing ZSM-5 Zeolites

[Fe]ZSM-5 zeolite samples with varying framework Fe content were first calcined under nitrogen at 480° C. for 3 hours. The $N_2$ calcined [Fe]ZSM-samples were ammonium exchanged using 1 M ammonium acetate solution (10-cc/g zeolite) at 65° C. for 1 hour, filtered and washed with deionized water. The ammonium exchange was repeated one more time and then the filter cake was dried and calcined in air at 540° C. for 6 hours. Physical properties of the H-form [Fe]ZSM-5 samples are summarized in Table 6. All of the exchanged zeolites exhibit excellent retention of surface area and zeolite crystallinity upon steam deactivation.

TABLE 6

Physical Properties of the Iron/Zeolite Examples

|  | [Fe]ZSM-5 | [Fe]ZSM-5 | [Fe]ZSM-5 | [Fe]ZSM-5 |
|---|---|---|---|---|
| Calcined Cat. | | | | |
| Fe loading, wt % | 2.4 | 4.4 | 6.2 | 10.4 |
| Al, wt % | 0.53 | 0.23 | 0.29 | 0.34 |
| Na, wt % | 0.012 | 0.036 | 0.052 | 1.3 |
| Surface area, $m^2g^{-1}$ | — | 385 | 375 | 243 |
| Alpha | 26 | 8 | 4 | 1 |
| Steam Deactivated Cat. (815° C. 4 hrs) | | | | |
| Surface area, $m^2g^{-1}$ | 335 | 354 | 338 | 194 |

Example 7

Framework Metal-Containing MeAPO Molecular Sieves

Metal-containing AlPO-11 and AlPO-5 were obtained from UOP (MeAPO). They were steamed in 100% steam at 815° C. for 4 hours before evaluation. Physical properties summarized in Table 7 indicate that FeAPO-5 and ZnAPO-5 have better hydrothermal stability than FeAPO-11 and MnAPO-5.

Example 8

Preparation of Vanadium/Alumina and Zinc/Alumina Catalysts

Catalysts in this example were prepared as reference cases to compare with vanadium-impregnated alumina catalysts so as to demonstrate the uniqueness of the metal/zeolite system (see below Example 16).

1. Preparation of $V/Al_2O_3$ Catalyst

Pseudobohemite amorphous alumina was made into fluid catalyst particles by spray drying an aqueous slurry of alumina. The spray-dried $Al_2O_3$ particles, with a surface area of 200 $m^2g^{-1}$, were impregnated to 1-wt % vanadium using a solution containing vanadium oxalate. The vanadium oxalate solution (6-wt % V) was prepared by heating 15 g of oxalic acid and 9.5 g $V_2O_5$ in 70 g of deionized $H_2O$. The mixture was heated until all the $V_2O_5$ reacted and dissolved. Additional $H_2O$ was added to the resulting vanadium solution until there was 100 g of total solution. The spray dried $Al_2O_3$ particles (99 g dry basis) were impregnated with 8.3 g of the 6% vanadium solution which had been diluted with $H_2O$ to 48 ml to fill the catalyst pores; The material was then dried for 2 hours at 100° C.

TABLE 7

Physical Properties of the MeAPO Molecular Sieves

|  | FeAPO-11 | MnAPO-5 | FeAPO-5 | ZnAPO-5 |
|---|---|---|---|---|
| Calcined Cat. | | | | |
| Metal loading, wt % | 2.3% Fe | 0.3% Mn | 2.1% Fe | 0.3% Zn |
| Na, ppm | 160 | <50 | <50 | 120 |
| Surface area, $m^2g^{-1}$ | 227 | 371 | 372 | 345 |
| Alpha | 0.5 | 1.4 | 1.1 | 2.6 |
| Steam Deactivated Cat. (815° C. 4 hrs) | | | | |
| Surface area, $m^2g^{-1}$ | 6 | 7 | 134 | 186 |

2. Preparation of Zn/Al2O3 Catalyst

Spray dried $Al_2O_3$, with a surface area of 200 $m^2g^{-1}$, was impregnated to 10-wt % Zn using a $Zn(NO_3)_2$ solution. 87.5 g of $Al_2O_3$ (dry basis) was impregnated with 45.5 g $Zn(NO_3)_2.6H_2O$ dissolved in enough $H_2O$ to make 49 ml of solution. The material was dried for 2 hours at 100° C. and then calcined for 2 hours at 650° C.

TABLE 8

Physical Properties of V/Al2O3 and Zn/Al2O3 additives.

|  | Zn/Al$_2$O$_3$ | V/Al$_2$O$_3$ |
|---|---|---|
| Calcined Cat. | | |
| Metal loading, wt % | 9.1% Zn | 0.95% V |
| Surface area, $m^2g^{-1}$ | 162 | 173 |

The following examples, Example 9 through 15, show improved catalytic cracking process utilizing the present sulfur removal additives.

Example 9

Fluid Catalytic Cracking Evaluation of Zinc Exchanged Zeolites

Zn/zeolites from Example 1 were pelleted and sized to an average particle size of approximately 7 micrometer (T), then steamed in a muffle furnace at 815° C. for 4 hours to simulate catalyst deactivation in an FCC unit. Ten weight percent of steamed Zn/zeolite pellets were blended with a steam deactivated, Super Nova D™ FCC catalyst obtained from W. R. Grace. Super Nova D™ was deactivated at 770° C., 20 hours, 50% steam.

The additives were tested for gas oil cracking activity and selectivity using an ASTM microactivity test (ASTM procedure D-3907). The vacuum gas oil feed stock properties are shown in a table below. A range of conversions was scanned by varying the catalyst-to-oil ratios and reactions were run at 525° C. Gasoline range product from each material balance was analyzed with a sulfur GC (AED) to determine the gasoline S concentration. To reduce experimental errors in S concentration associated with fluctuations in distillation cut point of gasoline, S species ranging from thiophene to $C_4$-thiophenes in syncrude (excluding benzothiophene and higher boiling S species) were quantitated and the sum was defined as "cut-gasoline S."

Properties of Vacuum Gas Oil Feed

| Charge Stock Properties | |
|---|---|
| API Gravity | 26.6 |
| Aniline Point, ° C. | 83 |
| CCR, wt % | 0.23 |
| Sulfur, wt % | 1.05 |
| Nitrogen, ppm | 600 |
| Basic nitrogen, ppm | 310 |
| Ni, ppm | 0.32 |
| V, ppm | 0.68 |
| Fe, ppm | 9.15 |
| Cu, ppm | 0.05 |
| Na, ppm | 2.93 |

-continued

Properties of Vacuum Gas Oil Feed

| Distillation | |
|---|---|
| IBP, ° C. | 180 |
| 50 wt %, ° C. | 380 |
| 99.5 wt %, ° C. | 610 |

Performances of the catalysts are summarized in Table 9, where the product selectivity was interpolated to a constant conversion, 65 wt % or 70 wt % conversion of feed to 220° C.-material.

TABLE 9

Catalytic Cracking Performance of the Zinc/Zeolite Examples

|  | Base Case | +10% Zn/ ZSM-5 | +10% Zn/ MCM-41 | Base Case | +10% Zn/ MCM-49 | +10% Zn/ Beta |
|---|---|---|---|---|---|---|
| Wt % Zn loading of zeolite only | N.A. | 1.5 | 8.3 | N.A. | 0.9 | 2.0 |
| MAT Product Yields | | | | | | |
| Conversion, wt % | 65 | 65 | 65 | 70 | 70 | 70 |
| Cat/Oil | 2.4 | 2.3 | 2.4 | 3.2 | 3.2 | 3.1 |
| H2 yield, wt % | 0.05 | +0.02 | +0 | 0.06 | +0.04 | +0.13 |
| C1 + C2 Gas, wt % | 1.1 | +0.4 | −0.1 | 1.4 | +0.3 | +0 |
| Total C3 Gas, wt % | 4.1 | +3.7 | +0 | 4.8 | +1.9 | +0.8 |
| C3 = yield, wt % | 3.5 | +3.1 | +0 | 4.1 | +1.3 | +0.7 |
| Total C4 Gas, wt % | 8.4 | +3.4 | +0 | 9.6 | +2.2 | +1.2 |
| C4 = yield, wt % | 4.4 | +1.3 | +0 | 4.8 | +0.2 | +0.5 |
| IC$_4$ yield, wt % | 1.0 | +1.8 | +0 | 4.0 | +1.7 | +0.6 |
| C5 + Gasoline, wt % | 48.9 | −8.0 | −0.4 | 50.8 | −5.5 | −3.0 |
| LFO, wt % | 29.5 | −0.8 | −0.1 | 24.9 | −0.2 | −0.3 |
| HFO, wt % | 5.52 | +0.8 | +0 | 4.6 | +0.1 | +0.3 |
| Coke, wt % | 2.2 | +0.4 | +0 | 2.6 | +0.9 | +0.8 |
| Cut Gasoline S, PPM | 502 | 394 | 453 | 374 | 328 | 284 |
| % Reduction in Cut Gasoline S | Base | 21.4 | 9.6 | Base | 12.4 | 24.3 |
| % Reduction in Gasoline S, Feed Basis | Base | 34.2 | 9.0 | Base | 21.8 | 28.7 |

The first three columns of Table 9 summarize performance enhancement by $Zn^{2+}$ exchanged ZSM-5 and MCM-41 zeolites when 10 wt % zeolite crystals were blended into a typical FCC catalyst for gasoline sulfur reduction. Gasoline sulfur concentration was reduced by 21.4% by Zn/ZSM-5 zeolites, and 9.6% by Zn/MCM-41. Zn/ZSM-5 converted some of gasoline and LCO range material to C3 and C4 olefins and isobutane. These valuable C3 and C4 components are typically alkylated to a gasoline range product and then blended back to the gasoline pool. Thus the net gasoline volume would not be reduced significantly when the potential alkylate yield is incorporated.

To address the gasoline volume loss by various zeolites, the desulfurization efficiency based on the feed S was also compared. When the desulfurization results are recalculated to incorporate the gasoline-volume-loss, Zn/ZSM-5 gave 34% S reduction, Zn/MCM41 9%. We observed only slight increases in hydrogen and coke yields. The poorer performance of Zn/MCM41 results suggest that acid sites as well as metal sites are required for gasoline sulfur reduction.

Zn exchanged MCM49 and Beta zeolites also exhibited potential for gasoline sulfur reduction at FCC conditions (Table 9). Gasoline S concentration was reduced by 12% by Zn/MCM49, and 24% by Zn/Beta. When the results are recalculated to incorporate the gasoline-volume-loss, Zn/MCM49 gave 22% S reduction, Zn/Beta 29%. Only moderate increases in hydrogen and coke yields were observed.

Example 10

Fluid Catalytic Cracking Evaluation of Vanadium Exchanged Zeolites

Vanadium exchanged zeolites from Example 2 were pelleted and sized to an average particle size of approximately 70 T, then steamed in a muffle furnace at 815° C. for 4 hours. Ten weight percent of the steamed V/ZSM-5, V/MCM-49 and V/Beta pellets were blended with a steam deactivated, Super Nova D™ FCC catalyst obtained from W. R. Grace. Steam deactivated V/USY pellet catalyst was blended with an equilibrium catalyst (Ecat) from an FCC unit. The equilibrium catalyst has very low metals level (120 ppm V and 60 ppm Ni). Performances of the V/zeolites are summarized in Table 10.

TABLE 10

Catalytic Cracking Performance of Vanadium/Zeolite

| | Steamed FCC Catalyst | | | | | |
|---|---|---|---|---|---|---|
| | Base Case | +10% V/ZSM-5 | +10% V/MCM-49 | +10% V/Beta | ECat Base | E-Catalyst +10% V/USY |
| Wt % V loading of zeolite only | N.A. | 0.2 | 0.4 | 0.8 | N.A. | 2.0 |
| MAT Product Yields | | | | | | |
| Conversion, wt % | 70 | 70 | 70 | 70 | 70 | 70 |
| Cat/Oil | 3.7 | 3.3 | 3.6 | 3.4 | 4.2 | 3.1 |
| H2 yield, wt % | 0.07 | +0.03 | +0.01 | +0.1 | 0.04 | +0.13 |
| C1 + C2 Gas, wt % | 1.5 | +1.3 | +0.2 | +0 | 1.6 | +0.03 |
| Total C3 Gas, wt % | 4.9 | +6.5 | +1.7 | +1.0 | 5.4 | −0.3 |
| C3 = yield, wt % | 4.0 | +4.9 | +1.2 | +0.8 | 4.4 | −0.5 |
| Total C4 Gas, wt % | 10.2 | +5.5 | +2.2 | +1.2 | 10.5 | −0.7 |
| C4 = yield, wt % | 4.7 | +1.5 | +0.5 | +0.7 | 4.9 | −0.7 |
| IC4 yield, wt % | 4.6 | +3.5 | +1.5 | +0.5 | 4.8 | −0.1 |
| C5 + Gasoline, wt % | 50.0 | −14.4 | −3.8 | −2.9 | 49.3 | +0.4 |
| LFO, wt % | 25.6 | −0.9 | −0.3 | −0.4 | 25.6 | −0.5 |
| HFO, wt % | 4.4 | +0.9 | +0.3 | +0.4 | 4.4 | +0.5 |
| Coke, wt % | 3.2 | +0.9 | +0.4 | +0.6 | 3.2 | +0.2 |
| Cut Gasoline S, PPM | 412 | 370 | 344 | 243 | 505 | 127 |
| % Reduction in Cut Gasoline S | Base | 10.1 | 16.6 | 41.0 | Base | 74.8 |
| % Reduction in Gasoline S, Feed Basis | Base | 35.9 | 22.8 | 44.4 | Base | 74.6 |

Vanadium aqueous exchanged zeolites are very effective in gasoline S reduction in MAT evaluations. Ten wt % blends of V/ZSM-5, V/MCM-49, V/Beta, and V/USY (0.8%) with a base cracking catalyst after steam deactivation gave favorable results in that 10%, 17% 41%, and 75% gasoline S reductions were observed respectively (Gasoline S concentration basis). When the results are recalculated to incorporate the gasoline-volume-loss, V/ZSM-5, V/Beta, and V/USY all look promising. Only moderate increases in hydrogen and coke yields were observed.

Example 11

Fluid Catalytic Cracking Evaluation of Iron Exchanged Zeolites

Iron exchanged zeolites from Example 3 were pelleted and sized to an average particle size of approximately 70 T, then steamed in a muffle furnace at 815° C. for 4 hours to simulate equilibrated performance in an FCC unit. Ten weight percent of Fe/MCM49, Fe/Beta and Fe/USY pellets were blended with an equilibrium catalyst from an FCC unit. The equilibrium catalyst has very low metals level (120 ppm V and 60 ppm Ni). Performances of the Fe/zeolites are summarized in Table 11.

TABLE 11

Catalytic Cracking Performance of Iron/Zeolite Examples

| | ECat Base Case | +10% Fe/MCM-49 | +10% Fe/Beta | +10% Fe/USY |
|---|---|---|---|---|
| Zeolite Fe loading, wt % | N.A. | 1.2 | 2.0 | 3.5 |
| MAT Product Yields | | | | |
| Conversion, wt % | 65 | 65 | 65 | 65 |
| Cat/Oil | 3.0 | 4.3 | 3.4 | 2.0 |
| H2 yield, wt % | 0.03 | +0.07 | +0.15 | +0.19 |
| C1 + C2 Gas, wt % | 1.0 | +0.5 | +0.2 | +0 |
| Total C3 Gas, wt % | 4.2 | +2.7 | +1.9 | −0.3 |
| C3 = yield, wt % | 3.5 | +1.5 | +1.5 | −0.4 |
| Total C4 Gas, wt % | 9.3 | +4.0 | +2.1 | −0.8 |
| C4 = yield, wt % | 4.7 | −0.1 | +0.9 | −1.0 |
| i-C4 yield, wt % | 4.0 | +3.5 | +1.1 | +0.1 |
| C5 + Gasoline, wt % | 47.9 | −9.6 | −6.1 | −0.8 |
| LFO, wt % | 29.7 | −1.7 | −0.3 | −0.1 |
| HFO, wt % | 5.4 | +1.7 | +0.3 | +0.1 |
| Coke, wt % | 2.5 | +2.5 | +1.9 | +1.6 |
| Cut Gasoline S, PPM | 566 | 395 | 347 | 283 |
| Reduction in Cut Gasoline S, % | Base | 30.2 | 38.7 | 50.0 |
| % Reduction in Gasoline S, Feed Basis | Base | 44.2 | 46.4 | 50.9 |

Iron exchanged zeolites are also effective in gasoline S reduction in MAT evaluations. Ten wt % blends of Fe/MCM-49, Fe/Beta, and Fe/USY with an equilibrium FCC catalyst gave 30%, 39%, and 50% gasoline S reductions (Gasoline S concentration basis). When the results are recalculated to incorporate the gasoline-volume-loss, Fe/MCM-49, Fe/Beta, and Fe/USY reduced the gasoline S by 44%, 46%, and 51%, respectively. Fe/MCM-49 and Fe/Beta converted significant portions of gasoline and LCO range products to C3 and C4 olefins and paraffins. Fe/USY maintained the liquid yields and slightly reduced C3 and C4 olefin yields.

The above yield structure suggests that metal exchanged ZSM-5, MCM-49, and Beta will be preferred desulfurization additives when increased C4-olefins and isoparaffins are desirable from an FCC along with low-sulfur gasoline. A metal-exchanged USY catalyst could be preferred when maximization of gasoline yield is more desirable.

Example 12

Fluid Catalytic Cracking Evaluation of Cobalt Exchanged Zeolites

Cobalt solid-state exchanged zeolites from Example 4 were pelleted and sized to an average particle size of approximately 70 T, then steamed in a muffle furnace at 815 C for 4 hours to simulate equilibrated performance in an FCC unit. Ten weight percent of steamed zeolite pellets were blended with an equilibrium catalyst from an FCC unit. The equilibrium catalyst has very low metals level (120 ppm V and 60 ppm Ni). Performances of the Co/zeolites are summarized in Table 12.

TABLE 12

Catalytic Cracking Performance of Cobalt/Zeolite Examples

|  | ECat Base Case | +10% Co/ZSM-5 (26/1) | +10% Co/ZSM-5 (450/1) | +10% Co/ USY | +10% Co/ MCM-41 |
|---|---|---|---|---|---|
| Zeolite Co loading, wt % | N.A. | 3.2 | 2.2 | 2.1 | 1.5 |
| MAT Product Yields |  |  |  |  |  |
| Conversion, wt % | 72 | 72 | 72 | 72 | 72 |
| Cat/Oil | 3.7 | 3.5 | 3.8 | 2.3 | 4.0 |
| H2 yield, wt % | 0.04 | +0.19 | +0.07 | +0.09 | +0.14 |
| C1 + C2 Gas, wt % | 1.7 | +1.2 | +0.1 | +0.4 | +0.1 |
| Total C3 Gas, wt % | 5.8 | +4.9 | +1.6 | +0.2 | +0.1 |
| C3 = yield, wt % | 4.9 | +3.5 | +1.4 | −0.6 | +0.1 |
| Total C4 Gas, wt % | 11.4 | +3.9 | +1.7 | −0.2 | +0.2 |
| C4 = yield, wt % | 5.6 | +0.9 | +0.9 | −1.6 | +0.3 |
| IC4 yield, wt % | 5.0 | +2.6 | +0.7 | +0.9 | −0.1 |
| C5 + Gasoline, wt % | 50.0 | −12.0 | −3.7 | −1.4 | −0.9 |
| LFO, wt % | 24.0 | −1.1 | −0.3 | −0.6 | +0 |
| HFO, wt % | 4.0 | +1.1 | +0.3 | +0.6 | +0 |
| Coke, wt % | 3.0 | +1.7 | +0.3 | +0.9 | +0.6 |
| Cut Gasoline S, PPM | 502 | 409 | 337 | 305 | 414 |
| Reduction in Cut Gasoline S, % | Base | 18.5 | 32.9 | 39.2 | 17.5 |
| % Reduction in Gasoline S, Feed Basis | Base | 38.1 | 37.9 | 40.8 | 19.1 |

These results show that cobalt exchanged zeolites are also effective in gasoline sulfur reduction in MAT evaluations. Ten wt % blends of Co/ZSM-5 (26/1), Co/ZSM-5 (450/1), Co/USY, and Co/MCM41 with an equilibrium FCC catalyst gave 19%, 33%, 39%, and 18% gasoline S reductions (Gasoline S concentration basis). When the results are recalculated to incorporate the gasoline-volume-loss, the gasoline S was reduced by 38%, 38%, 41%, and 19%, respectively.

Example 13

Fluid Catalytic Cracking Evaluation of Gallium Exchanged Zeolites

Gallium exchanged Beta and USY zeolites from Example 5 were pelleted and sized to an average particle size of approximately 70T, then steamed in a muffle furnace at 815° C. for 4 hours to simulate equilibrated performance in an FCC unit. Ten weight percent of zeolite pellets were blended with an equilibrium catalyst from an FCC unit. The equilibrium catalyst has very low metals level (120 ppm V and 60 ppm Ni). Performances of the Ga/zeolites are summarized in Table 13.

TABLE 13

Catalytic Cracking Performance of Gallium/Zeolite Examples

|  | ECat Base Case | +10% Ga/Beta | +10% Ga/USY |
|---|---|---|---|
| Zeolite Ga loading, wt % | N.A. | 3.1 | 5.6 |
| MAT Product Yields |  |  |  |
| Conversion, wt % | 70 | 70 | 70 |
| Cat/Oil | 3.3 | 3.3 | 2.4 |
| H2 yield, wt % | 0.04 | +0.15 | +0.22 |
| C1 + C2 Gas, wt % | 1.5 | +0.1 | +0.1 |
| Total C3 Gas, wt % | 5.7 | +0.6 | −0.2 |
| C3 = yield, wt % | 4.8 | +0.5 | −0.4 |
| Total C4 Gas, wt % | 11.5 | +0.8 | −0.6 |
| C4 = yield, wt % | 5.6 | +0.6 | −0.9 |
| IC4 yield, wt % | 4.9 | +0.2 | +0.2 |
| C5 + Gasoline, wt % | 48.5 | −2.4 | −1.0 |
| LFO, wt % | 25.3 | +0.3 | −0.6 |
| HFO, wt % | 4.7 | +0.3 | +0.6 |
| Coke, wt % | 2.6 | +0.8 | +1.4 |
| Cut Gasoline S, PPM | 505 | 440 | 320 |
| Reduction in Cut Gasoline S, % | Base | 13 | 36 |
| % Reduction in Gasoline S, Feed Basis | Base | 17 | 38 |

As shown by these results, gallium exchanged zeolites also reduce the gasoline sulfur at FCC conditions. Ten wt % blends of Ga/Beta and Ga/USY with an equilibrium FCC catalyst gave 13% and 36% gasoline S reductions (Gasoline S concentration basis).

Example 14

Fluid Catalytic Cracking Evaluation of Framework Fe-Containing ZSM-5 Zeolites

Framework iron containing [Fe]ZSM-5 zeolites from Example 6 were pelleted and sized to an average particle size of approximately 70 T, then steamed in a muffle furnace at 815° C. for 4 hours to simulate equilibrated performance in an FCC unit. Ten weight percent of zeolite pellets were blended with an equilibrium catalyst from an FCC unit. The equilibrium catalyst has very low metals level (120 ppm V and 60 ppm Ni). Performances of the [Fe]ZSM-5 are summarized in Table 14.

TABLE 14

Catalytic Cracking Performance of [Fe]ZSM-5 Examples

|  | Base Case | +10% [Fe]ZSM-5 | +10% [Fe]ZSM-5 | +10% [Fe]ZSM-5 |
|---|---|---|---|---|
| Zeolite Fe loading, wt % | N.A. | 4.4 | 6.2 | 10.4 |
| MAT Product Yields |  |  |  |  |
| Conversion, wt % | 70 | 70 | 70 | 70 |
| Cat/Oil | 3.3 | 3.2 | 3.1 | 3.5 |
| H2 yield, wt % | 0.03 | +0.06 | +0.07 | +0.07 |
| C1 + C2 Gas, wt % | 1.4 | +0.4 | +0.2 | +0.1 |
| Total C3 Gas, wt % | 5.4 | +0.7 | +0.3 | +0.1 |
| C3 = yield, wt % | 4.5 | +0.5 | +0.1 | +0.1 |
| Total C4 Gas, wt % | 10.8 | +0.8 | +0.3 | +0.2 |

TABLE 14-continued

Catalytic Cracking Performance of [Fe]ZSM-5 Examples

|  | Base Case | +10% [Fe]ZSM-5 | +10% [Fe]ZSM-5 | +10% [Fe]ZSM-5 |
|---|---|---|---|---|
| C4 = yield, wt % | 5.3 | +0.2 | +0 | +0.2 |
| i-C4 yield, wt % | 4.6 | +0.4 | +0.2 | +0 |
| C5 + Gasoline, wt % | 49.6 | −2.1 | −0.9 | −0.6 |
| LFO, wt % | 25.8 | −0.6 | −0.6 | −0.2 |
| HFO, wt % | 4.2 | +0.6 | +0.6 | +0.2 |
| Coke, wt % | 2.6 | +0.5 | +0.3 | +0.4 |
| Cut Gasoline S, PPM | 495 | 246 | 326 | 453 |
| Reduction in Cut Gasoline S, % | Base | 54.1 | 39.0 | 15.2 |
| % Reduction in Gasoline S, Feed Basis | Base | 56.1 | 40.2 | 16.2 |

ZSM-5 containing framework Fe is effective in gasoline S reduction in these MAT evaluations. Depending on framework Fe contents, blends of [Fe]ZSM-5 with an equilibrium FCC catalyst exhibited 54%, 39%, and 15% gasoline S reductions (Gasoline S concentration basis). The 4% Fe containing ZSM-5 showed the most favorable desulfurization activity. H2 and coke yields were increased only slightly with the desulfurization performance. The [Fe]ZSM-5 samples showed low gasoline-volume-loss, and low increases in coke and hydrogen yields.

Example 15

Fluid Catalytic Cracking Evaluation of Framework Metal-Containing MeAPO Molecular Sieves Framework iron containing FeAPO-5 molecular sieve from Example 7 was pelleted and sized to an average particle size of approximately 70 T, then steamed in a muffle furnace at 815° C. for 4 hours to simulate equilibrated performance in an FCC unit. Ten weight percent of FeAPO-5 pellets were blended with an equilibrium catalyst from an FCC unit. The equilibrium catalyst has very low metals level (120 ppm V and 60 ppm Ni). Performances of the FeAPO-5 are summarized in Table 15.

TABLE 15

Catalytic Cracking Performance of FeAPO-5 Molecular Sieves

|  | Base ECat | +10% FeAPO-5 |
|---|---|---|
| Molecular Sieve Metal loading, wt % | N.A. | 2.1% Fe |
| MAT Product Yields |  |  |
| Conversion, wt % | 70 | 70 |
| Cat/Oil | 3.2 | 3.1 |
| H2 yield, wt % | 0.03 | +0.02 |
| C1 + C2 Gas, wt % | 1.4 | +0.3 |
| Total C3 Gas, wt % | 5.4 | +0.6 |
| C3 = yield, wt % | 4.5 | +0.2 |
| Total C4 Gas, wt % | 10.9 | +1.4 |
| C4 = yield, wt % | 5.5 | +0.1 |
| i-C4 yield, wt % | 4.6 | +1.2 |
| C5 + Gasoline, wt % | 49.5 | −2.7 |
| LFO, wt % | 25.7 | −1.0 |
| HFO, wt % | 4.3 | +1.0 |
| Coke, wt % | 2.6 | +0.5 |
| Cut Gasoline S, PPM | 482 | 336 |
| Reduction in Cut Gasoline S, % | Base | 11.5 |
| % Reduction in Gasoline S, Feed Basis | Base | 16.3 |

FeAPO-5 molecular sieves also reduce the gasoline sulfur at FCC conditions. Ten wt % blends of FeAPO-5 with an equilibrium FCC catalyst gave 12% gasoline S reduction (Gasoline S concentration basis).

The following examples, Examples 16 and 17, show that it is important for the metal component to be located within the interior pore structure of the sieve component for effective gasoline desulfurization.

Example 16

Performance Comparison of Vanadium Exchanged Beta Catalysts vs. Vanadium/Alumina Catalyst Our invention of metal-exchanged zeolite concept is practiced in this example in a commercially viable fluid catalyst form (Catalysts A and B) and compared against a reference catalyst (V impregnated alumina catalyst, non-invention) from Example 8.

A V/Beta catalyst, Catalyst A, was prepared using a commercial NH4-form Beta with a silica-to-alumina ratio of 35. The NH4-form Beta was calcined under N2 at 480° C. for 3 hours then under air at 540° C. for 6 hours. Resulting H-form Beta was exchanged with $V^{4+}$ by an exchange with a $VOSO_4$ solution. The exchanged Beta was further washed, dried, and air calcined. The resulting V/Beta contains 1.3 wt % V. A fluid catalyst was prepared by spray drying aqueous slurry containing 40 wt % V/Beta crystals in a silica-alumina gel/clay matrix. The matrix contained 25 wt % silica, 5 wt % alumina, and 30 wt % kaolin clay. The spray dried catalyst was calcined at 540° C. for 3 hours. The final catalyst contains 0.56% V. Before evaluation in a pilot unit, the catalyst was deactivated at 770° C. and 1 Atm for 20 hours using 50% steam and 50% air.

A V/Beta catalyst, Catalyst B, was prepared using similar procedure as catalyst A except vanadium was loaded to a H-form Beta catalyst via post-exchange of vanadium. A commercial NH4-form Beta with a silica-to-alumina ratio of 35 was converted to a fluid catalyst by spray drying aqueous slurry containing 40 wt % Beta crystals in a silica-alumina gel/clay matrix. The matrix contained 25 wt % silica, 5 wt % alumina, and 30 wt % kaolin clay. The spray dried catalyst was calcined at 540° C. for 3 hours. The H-form Beta catalyst was exchanged with V4+ by an exchange with a $VOSO_4$ solution. The exchanged Beta catalyst was further washed, dried, and air calcined. The resulting V/Beta catalyst contains 0.45 wt % V. Before evaluation in a pilot unit, the catalyst was deactivated at 770° C. and 1 Atm for 20 hours using 50% steam and 50% air.

Ten weight percent of each catalyst was blended with an equilibrium catalyst from an FCC unit. The equilibrium catalyst has very low metals level (120 ppm V and 60 ppm Ni). Performances are summarized in Table 16.

TABLE 16

Catalytic Cracking Performance of V/Beta vs. V/Al2O3 Catalyst

|  | Base Ecat Case | +10% V/Beta (Catalyst A) | +10% V/Beta (Catalyst B) | +10% V/ Alumina |
|---|---|---|---|---|
| Additive Catalyst V Loading, wt % | N.A. | 0.56 | 0.45 | 1.0 |
| MAT Product Yields |  |  |  |  |
| Conversion, wt % | 70 | 70 | 70 | 70 |
| Cat/Oil | 3.2 | 3.2 | 2.8 | 3.8 |
| H2 yield, wt % | 0.03 | +0.06 | +0.04 | +0.19 |
| C1 + C2 Gas, wt % | 1.4 | +0 | −0.1 | +0.1 |
| Total C3 Gas, wt % | 5.4 | +0 | +0.4 | −0.1 |
| C3 = yield, wt % | 4.5 | +0 | +0.4 | −0.1 |
| Total C4 Gas, wt % | 10.9 | +0.1 | +1.0 | −0.2 |
| C4 = yield, wt % | 5.5 | +0.2 | +0.6 | +0.1 |
| i-C4 yield, wt % | 4.6 | −0.1 | +0.4 | −0.2 |
| C5 + Gasoline, wt % | 49.5 | −0.3 | −1.5 | −0.9 |
| LFO, wt % | 25.7 | +0 | −0.3 | +0 |
| HFO, wt % | 4.3 | +0 | +0.3 | +0 |
| Coke, wt % | 2.6 | +0.2 | +0.1 | +1.0 |
| Cut Gasoline S, PPM | 482 | 336 | 342 | 408 |
| Reduction in Cut Gasoline S, % | Base | 30.3 | 29.2 | 15.5 |
| % Reduction in Gasoline S, Feed Basis | Base | 30.8 | 31.2 | 17.1 |

Catalysts formulated based on the invention (Catalyst A and Catalyst B) show very effective reduction of gasoline S species. When 10 wt % of Catalyst A and B (4 wt % Beta zeolite addition) were blended each with an equilibrium FCC catalyst, 30% reduction in gasoline sulfur concentration was achieved. For comparison, V/Alumina catalyst gave only 15% reduction in gasoline S. Even though the vanadium loading was much higher in the final blend catalyst with the V/Alumina catalyst (0.1% vs. 0.02% V), the desulfurization activity is much lower. These unexpected results clearly show benefits of our invention. In addition, catalysts of the invention showed lower increases in hydrogen and coke yields.

Example 17

Performance Comparison of Vanadium Exchanged USY vs. Vanadium-Containing Equilibrium FCC Catalyst A V/USY catalyst, Catalyst C, was prepared using a low-unit-cell-size USY (24.35 Å UCS) with a bulk silica-to-alumina ratio of 5.4. As-received H-form USY was exchanged with V4+ by an exchange with a VOSO4 solution. The exchanged USY was further washed, dried, and air calcined. The resulting V/USY contains 1.3 wt % V. A fluid catalyst was prepared by spray drying aqueous slurry containing 40 wt % V/USY crystals in a silica-alumina gel/clay matrix. The matrix contained 25 wt % silica, 5 wt % alumina, and 30 wt % kaolin clay. The spray-dried catalyst was calcined at 540° C. for 3 hours. The final catalyst contains 0.46% V. Before evaluation in a pilot unit, the catalyst was deactivated at 770° C. and 1 Atm for 20 hours using 50% steam and 50% air.

Twenty-five weight percent of V/USY catalyst was blended with an equilibrium catalyst from an FCC unit. The equilibrium catalyst has very high metals level (2900 ppm V and 720 ppm Ni). Performances are summarized in Table 17.

TABLE 17

Catalytic Cracking Performance of V/USY Additive Catalyst vs. High V-Containing ECat

|  | High V E-Cat Case | +25% V/USY (Catalyst C) Invention |
|---|---|---|
| Total V loading on catalyst, wt % | 0.29 | 0.33 |
| MAT Product Yields |  |  |
| Conversion, wt % | 70 | 70 |
| Cat/Oil | 3.0 | 3.7 |
| H2 yield, wt % | 0.08 | +0.13 |
| C1 + C2 Gas, wt % | 1.2 | +0.3 |
| Total C3 Gas, wt % | 5.0 | +0.3 |
| C3 = yield, wt % | 4.3 | +0.2 |
| Total C4 Gas, wt % | 10.1 | +0.1 |
| C4 = yield, wt % | 5.8 | +0.2 |
| i-C4 yield, wt % | 3.7 | −0.2 |
| C5 + Gasoline, wt % | 46.2 | −1.5 |
| LFO, wt % | 29.1 | −0.3 |
| HFO, wt % | 5.9 | +0.3 |
| Coke, wt % | 2.1 | +0.7 |
| Cut Gasoline S, PPM | 367 | 273 |
| Reduction in Cut Gasoline S, % | Base | 25.6 |
| % Reduction in Gasoline S, Feed Basis | Base | 28.0 |

A catalyst formulated based on our invention (Catalyst C) shows additional benefits over high V-loaded equilibrium catalyst in reducing the gasoline S concentration. When 25 wt % of Catalyst C (10 wt % V/USY zeolite addition) was blended with an qeuilibrium FCC catalyst, 28% additional reduction in gasoline sulfur was achieved. For both cases in Table 17, the vanadium loadings of the final blend catalysts were similar (0.29% vs. 0.33% V), but Catalyst C showed additional desulfurization activity.

Example 18

Performance of Mo/MCM-49 /Alumina and Pd/Beta/Alumina Catalysts

This example shows importance of incorporating the metal ions into the zeolite pores and of a proper choice of metal to achieve low S gasoline production in FCC.

A Mo/MCM-49/Alumina catalysts, Catalyst D, was prepared using H-form 65 wt % MCM-49/35 wt % alumina extrudates. A physical mixture of 65 parts MCM-49 and 35 parts pseudobohemite alumina powder (LaRoche Versal™ alumina) was mulled to form uniform mixture and formed into 1.5 mm cylindrical shape extrudates using a standard augur extruder. The extrudates were dried on a belt filter at 120° C. and calcined under N2 at 540° C. for 3 hours. The extrudates were ammonium exchanged using 5 cc/g of NH4NO3 solution followed by drying and air calcination at 540° C. Then the catalyst was steamed at 100% steam at 480° C. for approximately 4 hours.

The H-form MCM-49/alumina extrudates were impregnated with 4 wt % Mo and 2 wt % P using a solution containing ammonium hetpamolybdate and H3PO4. Molybdenum ions in ammonium heptamolybdate solution are in polyanion cage structures made of 7 molybdenum atoms and 24 oxygen atoms, [Mo7O24]6-(Greenwood and Earnshaw, "Chemistry of the Elements", pp1177, Pergamon Press 1984). The Mo polyanions are too large to fit into the zeolite pores, thus all Mo atoms are selectively deposited to the outer surface of the zeolite crystals and the alumina matrix. The Mo impregnated extrudates were dried and calcined in the air at 540° C. for 3 hours.

A Pd/Beta/alumina catalyst, Catalyst E, was prepared by the following procedure. A physical mixture of 65 parts zeolite Beta and 35 parts pseudobohemite alumina powder was mulled to form a uniform mixture. A dilute solution of palladium tetraamine chloride (corresponding to 0.6 wt % Pd) was added to adjust the solid level of the muller mix into an extrudable paste. The muller mix was formed into 1.5 mm cylindrical shape extrudates using a standard augur extruder. The extrudates were dried overnight at 120° C., and then nitrogen calcined at 480° C. for 3 hours followed by a 6 hour air calcination at 540° C.

Catalysts D and E were sized to an average particle size of approximately 70 m, then steamed in a muffle furnace at 540° C. for 4 hours to simulate equilibrated performance in a FCC unit. Ten weight percent of the additive were blended with a lab deactivated FCC catalyst (Super Nova D™, W. R. Grace). Performances are summarized in Table 18.

TABLE 18

Catalytic Cracking Performance of Mo/MCM-49 and Pd/Beta Catalysts

| | Base Case | +10% Mo/MCM-49/Alumina (Catalyst D) | +10% Pd/Beta/Alumina (Catalyst E) |
|---|---|---|---|
| Additive Catalyst Metal Loading, wt % | N.A. | 4% Mo | 1% Pd |
| MAT Product Yields | | | |
| Conversion, wt % | 75 | 75 | 75 |
| Cat/Oil | 3.8 | 4.4 | 4.2 |
| H2 yield, wt % | 0.11 | +0.33 | +0.75 |
| C1 + C2 Gas, wt % | 2.2 | −0.2 | +0.3 |
| Total C3 Gas, wt % | 5.4 | −0.5 | +0.4 |
| C3= yield, wt % | 4.5 | −0.4 | +0.4 |
| Total C4 Gas, wt % | 12.3 | −0.7 | −0.4 |
| C4= yield, wt % | 6.3 | +0 | +0.2 |
| i-C4 yield, wt % | 4.9 | −0.5 | −0.4 |
| C5 + Gasoline, wt % | 50.2 | −1.3 | −5.8 |
| LFO, wt % | 21.3 | +0.1 | −0.4 |
| HFO, wt % | 3.7 | −0.1 | +0.3 |
| Coke, wt % | 3.4 | +2.4 | +4.8 |
| Cut Gasoline S, PPM | 368 | 359 | 668 |
| Reduction in Cut Gasoline S, % | Base | 2.5 | −81 |

The Mo/MCM-49/alumina catalyst (non-invention) showed very poor performance in gasoline desulfurization, with a sulfur reduction of only 2.5% in the gasoline. The poor performance of the catalyst is probably due to selection of undesirable metal (Mo) and the location of Mo (all in the binder as oppose to inside the zeolite pore structure).

Pd/Beta catalyst showed extremely poor performance, 80% increase of the gasoline S content. The poor performance of Pd/Beta is probably due to selection of undesirable metal with high hydrogenation functionality. Both catalysts exhibit substantial increases in coke and hydrogen yields. This example demonstrated that the location and selection of metal play key roles in gasoline desulfurization at FCC conditions.

We claim:

1. A fluidizable catalytic cracking product sulfur reduction additive catalyst for reducing the sulfur content of a catalytically cracked gasoline fraction during a catalytic cracking process, which comprises porous particles having a size ranging from about 20 to about 100 microns of USY zeolite having a UCS of from 2.420 to 2.455 nm, an alpha value of from 0.2 to 300 and a bulk silica:alumina ratio of at least 5.0 which contains within the interior pore structure of the zeolite a vanadium metal component in an oxidation state greater than zero in a matrix comprising alumina or silica-alumina with clay.

2. A fluidizable catalytic cracking product sulfur reduction additive catalyst according to claim 1 which contains from 0.2 to 5 weight percent, based on the weight of the zeolite, of the metal component.

3. A fluidizable catalytic cracking product sulfur reduction additive catalyst according to claim 1 in which the vanadium metal component has been introduced into the zeolite as an exchanged cationic species within the zeolite pores.

4. An integrated fluidizable catalytic cracking/product sulfur reduction catalyst for cracking a heavy hydrocarbon feed to produce liquid cracking products including gasoline and reducing the sulfur content of the catalytically cracked gasoline fraction during the catalytic cracking process, which comprises porous particles having a size ranging from about 20 to about 100 microns of USY zeolite having a UCS of from 2.420 to 2.455 nm, an alpha value from 0.2 to 300 and a bulk silica: alumina ratio of at least 5.0 which contains within the interior pore structure of the zeolite a vanadium metal component in an oxidation state greater than zero in a matrix comprising alumina or silica-alumina with clay.

5. An integrated fluidizable catalytic cracking/product sulfur reduction catalyst according to claim 4 which contains from 0.1 to 5 weight percent, based on the weight of the zeolite, of the vanadium metal component.

6. A fluidizable catalytic cracking product sulfur reduction additive catalyst according to claim 4 in which the vanadium metal component has been introduced into the zeolite as an exchanged cationic species within the zeolite pores.

* * * * *